United States Patent Office

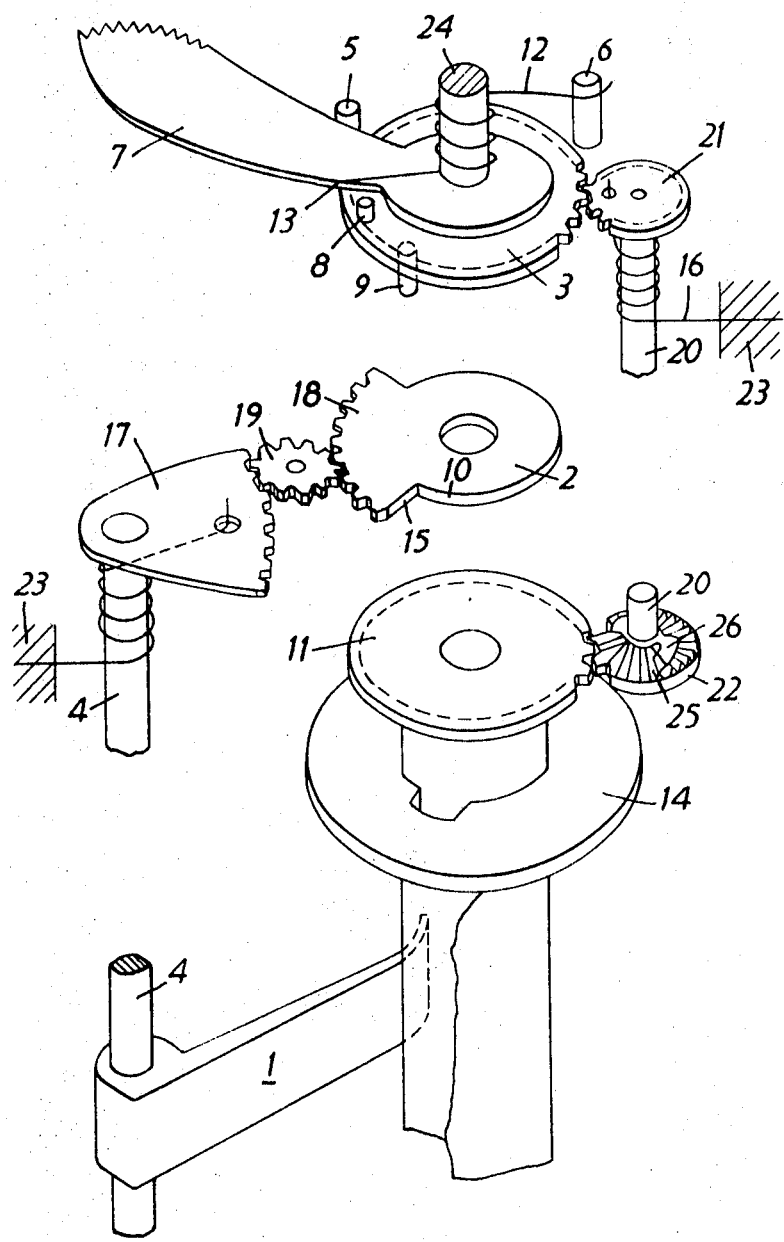

3,605,598
Patented Sept. 20, 1971

3,605,598
PHOTOGRAPHIC CAMERA WITH FILM TRANSPORT DEVICE
Hans Zimmet, Radebeul, Germany, assignor to Kombinat Veb Pentacon Dresden Kamera- und Kinowerke, Dresden, Germany
Filed Mar. 12, 1969, Ser. No. 806,652
Int. Cl. G03b 1/14
U.S. Cl. 95—31R  5 Claims

ABSTRACT OF THE DISCLOSURE

The housing of a photographic camera is provided with a film transport device having a film transport which moves the film a constant film length regardless of how much film has been wound onto the take up spool of the camera. The film transport lever can be moved in opposition to a restoring spring between an initial position determined by an initial stop mounted on the housing and a final position determined by an end stop mounted on the housing. A transport wheel is connected with a film key for the take up spool of the camera by way of a unidirectional drive means. The transport wheel is provided with a stroke control pin and a coupling pin each mounted near its periphery. The coupling pin projects into the path of an edge of the film transport lever. A stop wheel is pivotally mounted and provided with a stop edge, the wheel is coupled with a scanning lever which scans the winding diameter of the take up spool and positions the stop wheel in accordance with the quantity of film on the spool. Spring means is provided which urges the stroke control pin of the transport wheel into contact with the stop edge of the stop wheel so that the distance between the coupling pin and the edge of the transport lever is adjusted.

BACKGROUND OF THE INVENTION

The invention relates to a photographic camera with a film transport device for constant film lengths with a constant operating stroke for the transport arm.

Film transport devices of this kind are known in which the transport lever arm covers a region before it is coupled with the take up spool over which the film is not moved. The length of this region is increased with the number of photographs taken. A constant increase in the length of this region is brought about by a "frame gauge counting mechanism." Differences in the winding diameters of the film inserted, caused in particular by the use of films of different lengths, are not taken into account, so that deviations in the distances between one picture and another, as between shorter and longer films, are produced. Further, known film transport devices are provided with scanning levers for scanning the winding diameter of the take-up spool. These scannings levers control stops which limit the stroke of the transport lever arm as the winding diameter increases, so that the operating strokes of the transport arm continuously decrease.

The purpose of the invention is to obtain constant distances between one picture and another despite the insertion of films of different lengths, and without changing the operating stroke of the transport lever arm.

SUMMARY OF THE INVENTION

According to the invention, there is provided a photographic camera having a housing the provision of a film transport device for constant film lengths mounted on the housing and including:

(a) A film transport lever movable in opposition to a restoring spring from an initial position determined by an initial stop mounted on the housing into a final position determined by an end stop mounted on the housing;

(b) A transport wheel operatively connected via a unidirectional drive means with a film key for the take up spool of the camera, which wheel has a coupling pin and a stroke control pin each mounted near its periphery, the coupling pin projecting into the path of an edge of the film transport lever;

(c) A pivotally mounted stop wheel having a stop edge, which wheel is coupled with a scanning lever which scans the winding diameter of the take up spool to position the stop wheel according to the quantity of film on the take up spool;

(d) Spring means to urge the stroke control pin of the transport wheel into contact with the stop edge of the stop wheel, whereby the distance between coupling pin of the transport wheel and the said edge of the transport lever is adjusted.

It is desirable for the film transport lever arm, the stop wheel, the film key and the take-up spool to be mounted coaxially. In an advantageous version of the invention, the scanning lever is rotatably mounted on an adjusting shaft positioned parallel to the shaft of the take-up spool and is coupled with a toothed wheel segment which engages with a system of teeth on the stop wheel; the toothed segment is preferably engaged with the system of teeth of the stop wheel via an intermediate wheel. In addition, it is desirable for the unidirectional drive shaft to be positioned parallel to the shaft of the take-up spool and to engage with the transport wheel via a primary drive wheel fixed to the shaft and with the film key via a secondary drive wheel fixed to the shaft.

BRIEF DESCRIPTION OF DRAWING

The invention will be described by way of example with reference to the accompanying drawing which shows an exploded perspective view of a film transport device in accordance with the invention.

DESCRIPTION OF PREFERRED EMBODIMENT

In a camera housing 23, of which part is illustrated, a film transport lever 7 is rotatably mounted on a transport shaft 24.

A restoring spring 12 tends to move the transport lever 7 towards an initial stop 5. An end stop 6, integral with the housing, delimits the film transport stroke of the transport lever 7.

The lever 7 is provided with an edge 13, engageable with a coupling pin 8 of a transport wheel 3. The transport wheel 3 is also rotatably mounted on the transport shaft 24 and is provided with a stroke control pin 9. The control pin 9 is engageable with the stop edge 15 of the stop wheel 2. The stop wheel 2 is provided with a system of teeth 18 which engage with the toothed wheel segment 17 via the intermediate wheel 19. The toothed wheel segment 17 is rigidly connected with a control shaft 4, to the opposite end of which a scanning lever 1 is affixed.

A primary drive wheel 21, which is rigidly affixed to a unidirectional drive shaft 20, engages with the transport wheel 3. The unidirectional drive shaft 20 bears a leaf spring 26, which engages a peripheral tooth 25 of a secondary drive wheel 22. A restoring spring 16 tends to rotate the primary drive wheel 21 in an anti-clockwise direction.

The method of operation is as follows:

In the inoperative position the parts of the film transport device assume the position shown. The restoring spring 16 tends to rotate the primary drive wheel 21 in an anti-clockwise direction and the transport wheel 3 in the opposite direction. The stroke control pin 9 then rests against the stop edge 15 of the stop wheel 2. The stop wheel 2 is connected via the gearing train 18, 19, 17, with the scanning lever 1, which rests against the outer periphery of the film wound onto a take-up spool 14.

As the winding diameter increases, the scanning lever 1 is pivoted anti-clockwise. This movement of the scanning lever 1 is imparted via the control shaft 4 to the toothed wheel segment 17. Via the toothed intermediate wheel 19 the stop wheel 2 is rotated anti-clockwise, so that the stop edge 15 assumes a position corresponding to the particular diameter of the film wound on the take-up spool 14. Owing to the control pin 9 resting against the stop edge 15 the transport wheel 3 assumes an initial position which is characterised by a distance of the coupling pin 8 from the edge 13 of the film transport lever 7. This distance of the coupling pin 8 from the edge 13 changes in direct proportion to the winding diameter of the take-up spool 14. Transport of the film by one frame gauge is effected by rotating the film transport lever 7 about the transport shaft 24 in an anti-clockwise direction. After leaving the initial stop 5 the transport lever 7 does not move the film until the edge 13 engages the coupling pin 8. The film is then transported until the edge 13 engages the end stop 6. In this way the transport wheel 3 is driven via the coupling pin 8, the primary drive wheel 21 being rotated in opposition to the restoring spring 16. A claw of the leaf spring 26, which spring is rigidly connected with the primary drive wheel 21, then engages the peripheral teeth 25 and causes the secondary drive 22 to rotate in the same direction. The spring 26 together with the teeth 25 form a unidirectional drive means for the film. Owing to the engagement between the teeth of the secondary drive wheel 22 and those of a film key 11, the take-up spool 14 is rotated in an anti-clockwise direction. As more film is wound onto the spool, the scanning lever is displaced in the manner already described, and the distance of the coupling pin 8 from the edge 13, is increased.

I claim:

1. In a photographic camera having a housing, a film transport device for maintaining constant film length advancement comprising: a film take-up spool, a film spool key engageable with said spool, a film transport lever moveable in opposition to a restoring spring, an initial stop means mounted on said housing for determining a maximum rest position for said transport lever, an end stop means mounted on said housing for determining a maximum displacement of said lever, a transport wheel having a coupling pin projecting into the path of and engageable with an edge of said transport lever, and a stroke control pin, both pins being mounted near the periphery of said transport wheel, a unidirectional drive means operatively connecting said transport wheel with said film key, spring means biasing said transport wheel to rotate towards its rest position, a pivotally mounted stop wheel having a stop edge engageable with said stroke control pin to block the transport wheel from returning to its maximum rest position, a scanning lever for measuring the diameter of film on said take-up spool operatively coupled to rotate said stop wheel in response to a change in the diameter of the film on the spool, whereby the maximum rotation of the transport wheel decreases as film diameter on the take-up spool increases.

2. A photographic camera according to claim 1, wherein the film transport lever, the transport wheel, the stop wheel, the film spool key and the take-up spool are mounted coaxially.

3. A photographic camera according to claim 1 wherein an adjusting shaft is provided parallel to the film take-up spool and operatively connected to said scanning lever, and wherein the edge of said stop wheel has gear teeth operatively engaging gear teeth of a toothed wheel segment coupled to said adjusting shaft.

4. A photographic camera according to claim 3 wherein an intermediate gear is provided between and engaging the teeth of the stop wheel and the toothed wheel segment for transmitting the motion of the toothed wheel segment to the stop wheel.

5. A photographic camera according to claim 1 wherein the unidirectional drive means consists of a primary drive wheel engageable with the transport wheel, a secondary drive wheel engagable with the film spool key, a rotatable shaft fixed to said primary drive wheel, a leaf spring with a claw fixed to the other end of said rotatable shaft where said claw engages the secondary drive wheel when said rotatable shaft is rotated in one direction and disengages said wheel when the shaft is rotated in the other direction.

No references cited.

SAMUEL S. MATTHEWS, Primary Examiner

R. E. ADAMS, JR., Assistant Examiner

U.S. Cl. X.R.

242—71.3